Oct. 4, 1966    J. L. WATERMAN    3,276,947
LITHOGRAPHIC PRINTER'S BLANKET AND METHOD OF MAKING SAME
Filed April 17, 1961
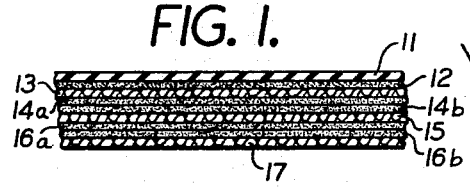
FIG. 1.
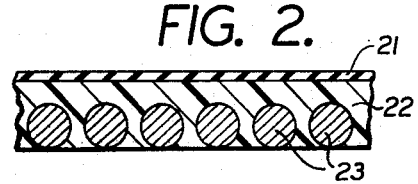
FIG. 2.
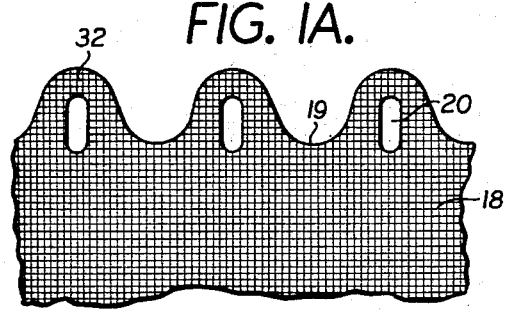
FIG. 1A.
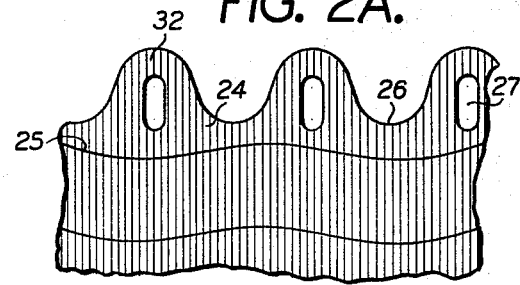
FIG. 2A.
PRIOR ART
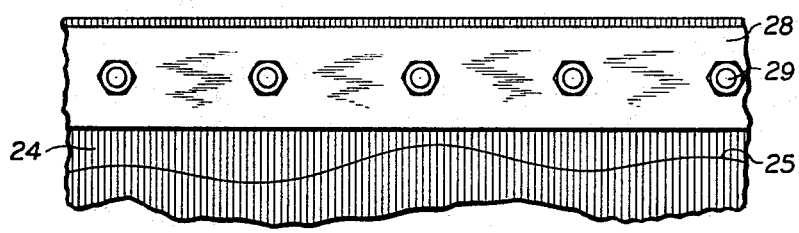
FIG. 3A.
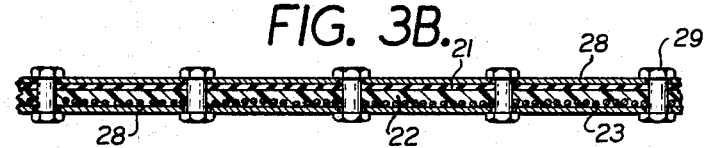
FIG. 3B.
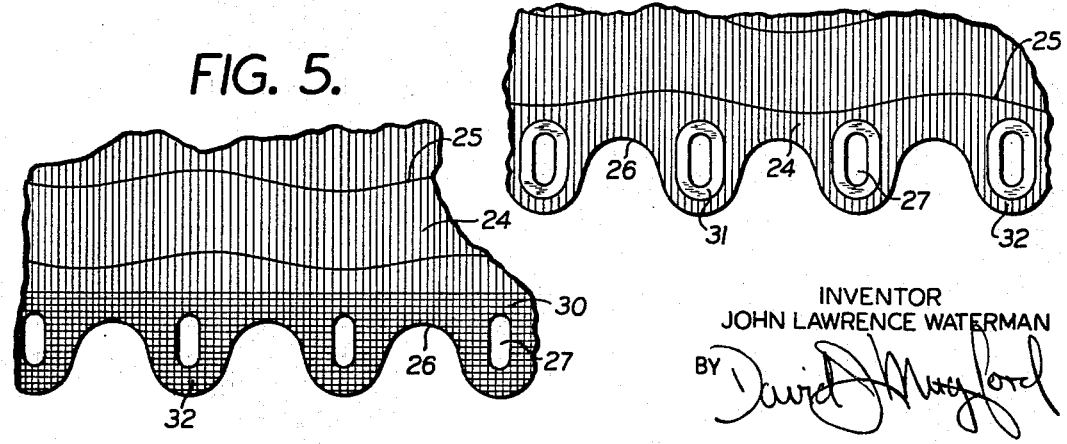
FIG. 4.
FIG. 5.
INVENTOR
JOHN LAWRENCE WATERMAN
BY
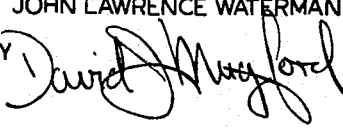
ATTORNEY.

United States Patent Office 3,276,947
Patented Oct. 4, 1966

3,276,947
LITHOGRAPHIC PRINTER'S BLANKET AND
METHOD OF MAKING SAME
John L. Waterman, Rehoboth, Mass., assignor to United
States Rubber Company, New York, N.Y., a corporation of New Jersey
Filed Apr. 17, 1961, Ser. No. 103,544
8 Claims. (Cl. 161—144)

This invention relates to a lithographic printer's blanket for use in an offset-printing press, and to the method of making said blanket.

Heretofore, offset-printer's blankets have consisted of a laminate of three (or four or, sometimes, two) layers of cotton fabric bonded together with a rubbery adhesive. The fabric is prestretched in the warp direction to reduce its stretch to meet the Lithographic Technical Foundation specification of less than 2% stretch. The bonding material is usually comprised of either natural or neoprene rubber made into a cement dough which is spread on the fabric. After spreading the cement on the fabric, a plurality of fabric layers are bonded together to form a multiple ply carcass. A rubber face (preceded by a base coating of adhesive) is then spread on this carcass.

It is an object of my invention to provide a lithographic printer's blanket which is more durable than those presently available for use on an offset printing press, i.e., a blanket with greater "smash" resistance to extraneous matter passing through an offset press.

Another object is to provide an offset lithographic printer's blanket having a simplified design and resulting in a more uniform product.

Still another object is to utilize polyurethane in an offset printer's blanket construction in order to provide a blanket having improved chemical resistance, improved compression-set properties, improved abrasion resistance, and improved ink affinity.

A further object is to provide a simple method for making these blankets which results in a lower-cost product.

In essence, these objects may be accomplished by a method of making a lithographic printer's blanket comprising embedding a multi-cord fabric in a layer of unvulcanized elastomeric compound, said elastomeric compound having a Shore "A" durometer value in the range of 30–100 and a tensile strength preferably in excess of 1500 p.s.i., coating one surface of this carcass with a facing layer comprised of an unvulcanized elastomeric compound having a Shore "A" durometer value of 40–70, vulcanizing the elastomeric compounds of both the carcass and facing layers, and cutting the coated carcass to the size of the finished blanket.

The invention will be better understood by referring to the accompanying drawing in which:

FIG. 1 is an exaggerated, fragmentary cross-sectional view of a conventional lithographic printer's blanket and FIG. 1A is a fragmentary plan view of this same blanket showing scalloped edges on the blanket and the fabric strands in detail.

FIG. 2 is an exaggerated, fragmentary cross-sectional view of the lithographic printer's blanket of this invention and FIG. 2A is a fragmentary plan view of this same blanket showing scalloped edges on the blanket and the strands of multi-cord fabric in detail.

FIG. 3A is a fragmentary plan view of the blanket of this invention showing the use of metal clamps for attaching the ends of said blanket to a press and FIG. 3B is a fragmentary cross-sectional view showing the blanket disposed between these metal clamps.

FIG. 4 is a fragmentary plan view of the blanket of this invention showing that metal inserts can be used with a "punched" or "scalloped" blanket for added strength.

FIG. 5 is a fragmentary plan view of the blanket of this invention showing the use of a band of fibers in the fill direction in the area of the scalloped edges.

The simplified blanket of my invention is used as a direct replacement for the more complicated and costly conventional three (two or four) ply offset lithographic printer's blanket shown in FIG. 1 and FIG. 1A. Referring now to FIG. 1, the three layers of fabric are represented by 13, 15, 17 and the bonding layers of cement are shown by 14a, 14b, 16a and 16b. An adhesive base coat 12 is used to adhere the layers of laminated fabric 13, 15 and 17 to a rubber-facing layer 11 which is usually about 0.020 inch thick.

My novel lithographic printer's blanket is illustrated by FIG. 2 wherein multi-cord strands 23 are embedded in an elastomeric layer 22, having a Shore "A" durometer value of between 30–100. Thus, the multi-cord fabric 23 forms an integral part of the carcass layer. This carcass layer is coated with face 21 of an elastomeric compound having a Shore "A" durometer value of between 40–70.

The multi-cord fabric 23 may be tire-cord fabric which is used in the manufacture of tires and consists of heavy threads 24 in the warp direction with only minor strands 25 in the fill direction to provide alignment as shown in FIG. 2A. By usage of the term "multi-cord" I mean any and all types of fiber or filament yarns that consist primarily of strands in the warp direction, with only such strands of yarn in the fill direction as are necessary to provide alignment of the warp strands. Commercially available "tire-cords" are usually nylon or rayon construction, however, "Dacron" and glass fiber cord are available.

I prefer to use a multi-cord fabric having a maximum gauge of 0.045 inch. The most frequently used commercial fabric is 0.025–0.029 inch gauge. The minimum restriction on gauge would be expressed in terms of breaking strength. In other words, as long as the cord possesses a breaking strength preferably in excess of 200 p.s.i. (as measured with a Scott tester at 12 inches per minute), the minimum gauge is not critical. Gauge requirements are necessary because of press design. Most offset press cylinders are now undercut approximately 0.070–0.075 inch, which require blankets of overall thickness of 0.067 plus or minus 0.002 inch. If the press designers change this cylinder undercut, it will be necessary to change the overall blanket thickness a like amount. Accordingly, the thickness of the multi-cord fabric will be changed a like amount.

Two performances are necessary for a satisfactory offset printer's blanket: (I) It must print properly (i.e. it must have good printability) and (II) The blanket face must maintain its shape to retain register.

Proper printing is influenced by the hardness of the rubber-face polymer which usually has a 50–60 Shore "A" durometer value with facing compounds now in use, the smooth definition of the surface, and to a certain extent the surface reactions of the face polymer itself with the ink and water. The lithographic printer's blanket of this invention does not materially differ in the "face" portion of the blanket from a conventional blanket. Thus, both my novel construction and the conventional blanket have these enumerated properties.

Maintaining the shape of the blanket face in order to retain register is accomplished in the conventional blanket by using a plurality of laminated plies of fabric for strength, using an elastomeric compound in the face portion which is resistant to chemical attack from the various ink and wash solutions used, obtaining a blanket which is resistant to sinking, which characteristic is usually associated with a breakdown of the fibers in the conventional carcass of laminated fabric, using rubber compounds having adequate resilience and compression-set properties, and maintaining an even gauge throughout the blanket, i.e. plus or minus 0.001 inch in thickness in any portion of said blanket. The use of multi-cord in my construction permits a savings of more than 50% of the dollar cost of three plies of cotton blanket fabric alone. Also, elastomeric compounds which are resistant to attack are preferred in my construction. There can be no breakdown of fibers in my construction which cause the blanket to sink or lose gauge, as in the conventional construction consisting of three laminated layers of fabric, because of the use of low compression-set rubber in the carcass with strands of multi-cord embedded therein.

It is known that the primary strength of a printer's blanket must be in the warp direction, i.e., the direction around the cylinder of a press. This is because the blanket is tightened on the press in that direction.

I have found that the necessary strength can be imparted to a printer's blanket by coating a multi-cord with a compound that has a Shore "A" durometer value in the range of 30–100 and preferably a tensile strength in excess of 1500 p.s.i. to an overall gauge preferably in the range of 0.040–0.055 inch, but maintained preferably to a tolerance of plus or minus 0.002 inch. This coating may be comprised of an oil-resistant elastomer such as polyurethane rubber or an acrylonitrile-butadiene copolymer. Completion of this step corresponds to making the multiple ply carcass of a conventional blanket. A face coat comprising an elastomeric compound having a Shore "A" durometer value in the range of 40–70 is applied to this carcass by conventional means, such as calendering or spreading. Again, this face compound preferably is comprised of polyurethane rubber of acrylonitrile-butadiene copolymer. The construction is then cured by conventional means, such as press-molding or by wrapping on a drum, interleafed with a release paper and curing same in a vulcanizer under pressure.

The physical properties which generally are desirabe for the elastomeric compounds used to make the blanket of this invention are as follows:

(1) Shore "A" Durometer Value—the elastomeric facing compound should have a durometer value of between 40–70 and the elastomeric carcass compound should have a durometer value of between 30–100.

(2) Resilience—both facing and carcass compounds should have a Bashore value of 20 minimum.

(3) Compression Set "Method B"—25% maximum at 30% test compression for both facing and carcass compounds.

(4) Oil Absorption—both facing and carcass compounds should absorb less than 0.01 gram of boiled linseed oil per square inch of surface area and should not swell more than 0.0005 inch. The test cylinder is 2½ inches in diameter and the oil depth is 0.5 inch with a test time of 20 hours. The sample is weighed before and after the test.

(5) Petroleum Distillate Absorption—both compounds should absorb less than 0.02 gram of petroleum distillate per square inch of surface area when tested as in (4), except that a petroleum distillate having a boiling range of 535° to 593° F. and a Kauri-Butanol number of 27.5 may be used in place of linseed oil.

(6) Water Absorption—both compounds should swell less than 0.0005 inch when tested as in (4).

The term "oil-resistant" as used herein with reference to the elastomeric compounds means resistant to either oil or ink vehicle. However, I have broadened its meaning to include other extremely necessary properties, i.e. low compression-set, high resilience, good ink affinity, satisfactory processing characteristics, etc.

The following elastomers may be used for either the carcass or facing composition depending on the use of the finished printer's blanket, said elastomers suffering from the conditions as described: Natural rubber will swell and emboss on continued exposure to modern quick-drying inks, "Neoprene" rubber does not possess sufficient resilience or ink affinity to produce clear reproductions, "Thiokol" rubber has extremely poor ink affinity, compression-set properties and resilience but is very chemically resistant, and butyl rubber has poor processing characteristics.

The elastomeric compounds used in my construction may contain any and all of the usual compounding materials, such as plasticizers, fillers, curatives, accelerators, processing aids, colors, etc., that are used in conventional compounding techniques providing that the resulting compound has the properties specified herein. The facing compound and the carcass compound may consist of one or more rubbers and the rubbers used in these compounds may be alike or different, e.g. natural rubber may be used in the carcass compound and NBR or "nitrile" rubber may be used in the facing compound.

Acrylonitrile-butadiene copolymers (NBR) are commonly referred to as low, medium or high, depending on the concentration of acrylonitrile to butadiene polymer, e.g. 20% acrylonitrile to 80% butadiene is referred to as "low nitrile"; 28% acrylonitrile to 72% butadiene is referred to as "medium nitrile"; 35% acrylonitrile to 65% butadiene is referred to as "high nitrile." Generally, the "low nitrile" rubber is used in offset printer's blankets.

As the acrylonitrile content goes up, oil resistance increases but, conversely, resilience decreases. Low and medium nitrile rubbers, or mixtures of the two, produce, the optimum compromise between oil resistance and resilience.

I prefer to use polyurethane rubber for both facing and carcass compounds because blankets made from these rubbers do not contain plasticizers and show improvement in chemical resistance, abrasion resistance, resilience, compression-set properties, and ink affinity as compared to those made with other rubbers, including NBR.

Various polyurethane rubbers may be used. These polyurethane rubbers are made by the reaction of polyisocyanate with polyester or polyether; the exact ratio of these components differing somewhat depending on the type and the manufacture. Polyurethanes capable of being vulcanized to a durometer value within the required range are satisfactory, such as "Vibrathane" marketed by the Naugatuck Chemical Division of the United States Rubber Company, "Adiprene" marketed by E. I. Du Pont de Nemours & Company, "Nacconate" marketed by the National Aniline Division of the Allied Chemical & Dye Company, "Mondur" and "Multron" marketed by the Mobay Chemical Company.

These polyurethane rubbers may be used in one of the following manners, but the use thereof is not restricted by these examples:

*Example 1.*—A tire-cord fabric is skim-coated with a polyurethane compound made according to the following recipe:

| | Parts by weight |
|---|---|
| Vibrathane A–509(a) | 70.00 |
| Vibrathane A–506(a) | 30.00 |
| Stearic Acid | 0.50 |
| SAF Carbon Black | 80.00 |
| Di Cup 40C(b) | 8.00 |
| | 188.50 |

(a) Polyurethane elastomers marketed by the Naugatuck Chemical Division of the United States Rubber Company.

(b) Dicumyl peroxide marketed by the Hercules Chemical Company.

This carcass is skim-coated with a layer of polyurethane compound made according to the following recipe:

| | Parts by weight |
|---|---|
| Vibrathane A-509 | 100.00 |
| Stearic Acid | 0.50 |
| SRF Carbon Black | 30.00 |
| Di Cup 40C | 6.00 |
| | 136.50 |

The above ingredients are mixed with methyl ethyl ketone until a dough is formed. After spreading this dough on the carcass as a facing layer, the coated carcass is vulcanized in a press or as a roll form in dry inert atmosphere, such as nitrogen gas.

*Example 2.*—A blanket is cast on a tire-cord fabric from a liquid pre-polymer, i.e. "Adiprene L" using toluene diisocyanate as the cross-linking agent. The necessary durometer specifications can be obtained by using 8–12 parts by weight of the diisocyanate per 100 parts by weight of the pre-polymer. This carcass is skim-coated with the facing polyurethane compound of Example 1 and is then vulcanized in a press in dry inert atmosphere.

Conventional offset blankets are attached to presses by the use of clamps 28; the blanket being disposed between these clamps 28 and held in place by clamp bolts 29 as shown in FIG. 3A and FIG. 3B. There are few presses on the market which provide for the attachment of the blanket to the press by scalloping the edge 26 with holes 27 and then hooking these holes over prongs which form an integral part of the press. In order to utilize this invention in these few cases, it is necessary to modify the blanket construction to some extent. In the conventional three-ply offset blanket as shown in FIG. 1A, the three-ply construction gives strength to the blanket in the area 32 and, therefore, prevents rupturing where the blanket is attached to the press. In my construction as shown in FIG. 2A there is only one layer of cord and the only thing preventing elongation or pulling out is the strength of the elastomeric compound in the area 32. This deficiency in blankets without clamps (referred to as "punched or scalloped" blankets) can be overcome by pressing in metal inserts 31 in the punched holes 27 to prevent the blanket from rupturing or pulling out in the area 32 as shown in FIG. 4. Another modification is shown in FIG. 5 wherein a layer of elastomer is removed in the area of the scallops and a band of fibers in the full direction 30 is adhered to the blanket.

While certain representative embodiments and details have been shown for the purpose of illustrating the invention, it will be apparent to those skilled in this art that various changes and modifications may be made therein without departing from the spirit or scope of the invention.

Having thus described my invention, what I claim and desire to protect by Letters Patent is:

1. A lithographic printer's blanket for use in an offset printing press, comprising a carcass having a single layer of multi-cord fabric embedded in a vulcanized elastomeric compound having a Shore "A" durometer value in the range of 30–100, said carcass being coated on one surface with a facing layer comprised of a vulcanized elastomeric compound having a Shore "A" durometer value of 40–70.

2. A lithographic printer's blanket for use in an offset printing press as in claim 1, wherein the marginal edges of the blanket, which are perpendicular to the warp of the multi-cord fabric, are provided with means for attaching said blanket to a press.

3. A lithographic printer's blanket for use in an offset printing press as in claim 1, wherein the multi-cord fabric is embedded in a vulcanized elastomeric compound comprised of polyurethane rubber.

4. A lithographic printer's blanket for use in an offset printing press as in claim 3, wherein the vulcanized elastomeric facing layer is comprised of polyurethane rubber.

5. A lithographic printer's blanket for use in an offset printing press as in claim 3, wherein the vulcanized elastomeric facing layer is comprised of butadiene:acrylonitrile copolymer rubber.

6. A method of making a lithographic printer's blanket for use in an offset printing press comprising embedding a single layer of a multi-cord fabric in a layer of unvulcanized elastomeric compound to form a carcass, said elastomeric compound having a Shore "A" durometer value in the range of 30–100, coating one surface of said carcass with a facing layer comprising an unvulcanized elastomeric compound having a Shore "A" durometer value of 40–70, vulcanizing the elastomeric compounds of both the carcass and facing layer, and cutting the coated carcass to the size of the finished blanket.

7. A method of making a lithographic printer's blanket for use in an offset printing press as in claim 6, wherein the elastomeric compound of both the carcass and facing layer comprises an unvulcanized polyurethane rubber.

8. In a lithographic printer's blanket suitable for use in an offset press comprising a carcass and a facing layer, the improvement wherein said carcass comprises a single layer of multi-cord fabric consisting primarily of strands of filament yarns in the warp direction with only such strands of yarn in the fill direction as are necessary to provide alignment of the warp strands, embedded in a vulcanized elastomeric compound.

References Cited by the Examiner

UNITED STATES PATENTS

| | | | |
|---|---|---|---|
| 748,093 | 12/1903 | Pancoast | 161—401 |
| 1,162,396 | 11/1915 | Price | 161—144 |
| 1,349,911 | 8/1920 | Pratt | 154—46 |
| 1,897,148 | 2/1933 | Rowell. | |
| 2,065,442 | 12/1936 | Freedlander | 161—88 |
| 2,271,125 | 1/1942 | Juve | 154—54.5 |
| 2,512,940 | 6/1950 | Janke | 101—415.1 |
| 2,792,321 | 5/1957 | Fredericks | 161—401 |
| 2,805,182 | 9/1957 | Hallenbeck. | |
| 2,947,341 | 8/1960 | Hershey. | |
| 3,008,860 | 11/1961 | Balkin et al. | 161—144 X |
| 3,012,498 | 12/1961 | Gurin | 161—401 |
| 3,033,709 | 5/1962 | Brown | 161—401 |

EARL M. BERGERT, *Primary Examiner.*

R. J. CARLSON, P. DIER, *Assistant Examiners.*